United States Patent [19]

Curran et al.

[11] Patent Number: 5,220,895
[45] Date of Patent: Jun. 22, 1993

[54] METHOD AND SYSTEM FOR MODIFYING A CONTROL SIGNAL FOR A FUEL INJECTOR OF A FUEL DELIVERY SYSTEM

[75] Inventors: Judith M. Curran, Farmington Hills; Raymond L. Willey, Redford, both of Mich.

[73] Assignee: Ford Motor Company, Dearborn, Mich.

[21] Appl. No.: 976,875

[22] Filed: Nov. 16, 1992

[51] Int. Cl.$^5$ .......................................... F02M 51/00
[52] U.S. Cl. ................................ 123/491; 123/179.13
[58] Field of Search ............... 123/491, 179.3, 179.13, 123/179.14, 1 A, 1 R; 364/431.1

[56] References Cited

U.S. PATENT DOCUMENTS

| | | | |
|---|---|---|---|
| 4,926,806 | 5/1990 | Ahorn et al. | 123/491 |
| 4,951,633 | 8/1990 | Achleitner et al. | 123/491 |
| 5,146,882 | 9/1992 | Brinkman, Jr. et al. | 123/491 |
| 5,179,925 | 1/1993 | Orminski | 123/491 |

Primary Examiner—Raymond A. Nelli
Attorney, Agent, or Firm—Roger L. May; Peter Abolins

[57] ABSTRACT

A method and system are provided for modifying a control signal of a fuel injector of a fuel delivery system wherein at least one shut-down temperature signal representing the temperature of an internal combustion engine is utilized together with other input signals to calculate a net amount of heat transferred to the fuel delivery system. The signals are utilized to calculate a correction factor, which correction is used to modify the control signal for the fuel injector. Preferably, two shut-down temperature signals are utilized, an engine coolant shut-down temperature signal and an air charge shut-down temperature signal to calculate the net amount of heat transferred. The modified control signal provides accurate control of the fuel injector by compensating for the increased volatility of the heated liquid fuel. When the liquid fuel is a blended fuel such as gasoline/methanol, a blend signal is generated based on the relative amount of one of the liquid fuels in the blended fuel and the step of calculating the correction factor is also based on the blend signal. The method and system provide improved hot start fuel control.

28 Claims, 6 Drawing Sheets

METHOD AND SYSTEM FOR MODIFYING A CONTROL SIGNAL FOR A FUEL INJECTOR OF A FUEL DELIVERY SYSTEM

TECHNICAL FIELD

This invention relates to method and systems for modifying a control signal for a fuel injector of a fuel delivery system and, in particular, to method and systems for modifying a control signal for a fuel injector of a fuel delivery system wherein a net amount of heat transferred to the fuel delivery system is calculated to compensate for the increased volatility of the heated fuel.

BACKGROUND ART

Under conditions of high fuel injector tip temperatures, injector fuel delivery decreases as a function of increasing injector tip temperature. The amount of vaporized fuel delivered by the fuel injector increases as hot soak time increases and as conducted heat, for example, from the cylinder head of the internal combustion engine and/or as radiated heat such as from the intake/exhaust manifold of the engine increases. Higher fuel pressure or lower fuel volatility helps to solve this problem. However, fuel volatility is beyond the developer's control.

Hot injector compensation has been applied to obtain fuel flow control. However, such prior art methods fail to compensate for high temperature soak conditions. Consequently, these prior methods and systems do not provide accurate hot start fuel control when the fuel is particularly volatile.

SUMMARY OF THE INVENTION

An object of the present invention is to provide a method and system for modifying a control signal for a fuel injector of a fuel delivery system by providing accurate control of the fuel injector during a time when the fuel is particularly volatile.

Another object of the present invention is to provide a method and system for modifying a control signal for a fuel injector of a fuel delivery system by providing for an improved hot start capability.

Still another object of the present invention is to provide a method and system for modifying a control system for a fuel injector of a fuel delivery system wherein the fuel injector is adapted to inject a blended liquid fuel into an internal combustion engine and wherein blended fuel volatility is predicted for improved hot start fuel control.

In carrying out the above objects and other objects of the present invention, in a fuel delivery system including a fuel injector for injecting a liquid fuel into an internal combustion engine, a method is provided for modifying a control signal for the fuel injector. The volatility of the liquid fuel changes as a function of the temperature of the fuel delivery system. The engine has a first mode of operation in which the fuel is injected into the engine and a second mode of operation after the first mode in which the fuel is not injected into the engine. The method includes the steps of generating a first set of temperature signals based on the temperature of the engine and storing a data representation of a first shut-down temperature signal of the first set of temperature signals in memory. The first shut-down temperature signal is based on the temperature of the engine at the end of the first mode. The method also includes the steps of retrieving from memory the data representation of the first shut-down temperature signal at the end of the second mode just prior to re-entering the first mode and calculating a net amount of heat transferred to the fuel delivery system based on a data representation of the first set of temperature signals including the data representation of the shut-down temperature signal. The method finally includes the step of calculating a correction factor based on the net amount of heat transferred to the fuel delivery system and modifying the control signal based on the correction factor to obtain a modified control signal. The modified control signal provides accurate control of the fuel injector by compensating for the volatility of the fuel.

Further in carrying out the above objects and other objects of the present invention, a system is provided for carrying out each of the above noted method steps.

The advantages of the method and system of the present invention are numerous. For example, hot injector compensation is not merely a function of the current temperature of the engine but also is a function of the temperature of the engine at shut-down. Consequently, the fuel injector compensates for soak time for improved hot start fuel control.

The above objects and other objects, features, and advantages of the present invention are readily apparent from the following detailed description of the best mode for carrying out the invention when taken in connection with the accompanying drawings.

BEST MODE FOR CARRYING OUT THE INVENTION

Figure 1:
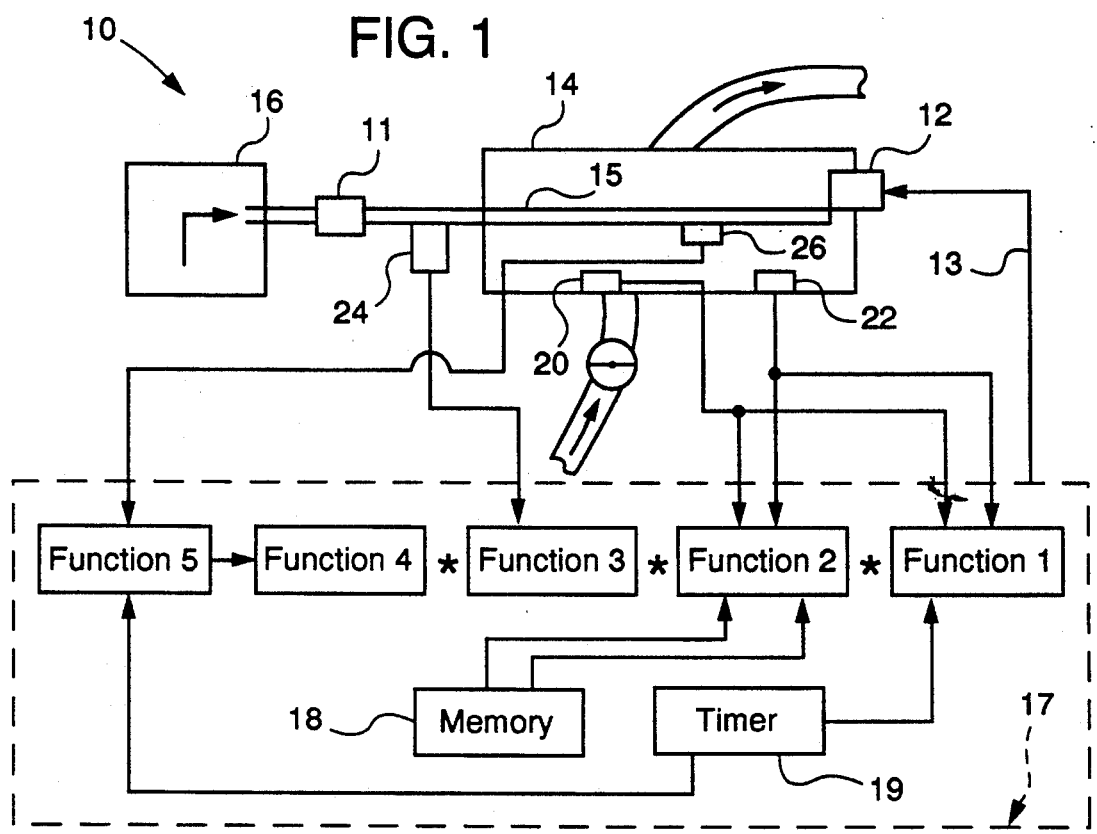
FIG. 1 is a schematic block diagram illustrating the method and system of the present invention.

Referring now to the drawing figures, there is illustrated in FIG. 1 a fuel delivery system, generally indicated at 10, which includes a fuel pump 11 and a plurality of fuel injectors (only one of which is shown at 12) for injecting a liquid fuel into an internal combustion engine 14 of a motor vehicle. In general, the volatility of the liquid fuel changes as a function of the temperature of the fuel is the fuel delivery system 10. The system also includes a fuel rail 15 which delivers fuel from a fuel storage tank 16 to the fuel injector 12.

When the liquid fuel is a blended fuel such as a gasoline/methanol blend the volatility of the blended fuel is particularly temperature sensitive. However, it is to be understood that the method and system of the present invention can also be utilized with a liquid fuel such as natural gas or other liquid fuels.

The engine 14 has a first mode of operation during which the fuel is injected into the engine 14 by the fuel injector 12 under control of a computer controller, generally indicated at 17. The engine 14 also has a second mode of operation which occurs after the first mode of operation of the engine and during which the fuel is not injected into the engine 14 by the fuel injector 12.

The controller 17 includes a central processing means or unit (CPU), an electronic storage device or working memory 18 such as RAM, an internal timer 19 and an interconnecting system bus (not shown).

In general, the method and system of the present invention is provided for calculating a hot injector compensation value which is utilized to modify the pulse width of the fuel control signal sent on line 13 from the controller 17 to the fuel injector 12. This value compensates for the increased volatility of the fuel due to the net amount of heat transferred to the fuel delivery system 10 and, consequently, to the fuel.

For methanol blended fuels, the controller 17 generally utilizes readily available temperature information from temperature sensors 20 and 22 associated with the engine 14, percent-of-methanol information from a sensor 24 which generates a signal based on the percent of methanol in the blended fluid and a temperature signal from a sensor 26 based on the temperature of the fuel in the fuel rail 15.

During high temperature soak and run conditions, the fuel pulse width is increased due to changes in the density and the partial vapor state of the fuel. This improves hot start conditions.

The correction factor or value, HICOMP, is utilized to modify the pulse width of the control signal to the fuel injector 12 and is given by the following equation:

$$\text{HICOMP} = \text{Function1 (ATMR3, temp\_frac)}$$
$$* \text{Function2 (delta\_temp, abs\_temp)}$$
$$* \text{Function3 (PM)} * \text{Function4 (FUELRAIL\_TMR)}$$

Definitions of the variables and constants utilized in obtaining the hot injector compensation value, HICOMP, and which are noted in the drawing figures are as follows:

DEFINITIONS

Variables

ACT = Air Charge Temperature, degrees F from sensor 20.

ACTOFF = Air Charge Temperature last read during closed loop control of the fuel injector 12 in degrees F from memory 18.

ATMR3 = Time since entering RUN mode from timer 19.

ECT = Engine Coolant Temperature, degrees F from sensor 22.

ECTOFF = Engine Coolant Temperature last read during closed loop control of the fuel injector 12 in degrees F from memory 18.

FUELRAIL_TMR = Fuel rail hot timer. When time is greater than zero, the hot rail multiplier is used to compute HICOMP. Timer counts down.

Function1 = HICOMP time multiplier which is a function of:
  Time in run mode (ATMR3); and
  A temperature proportioning factor (temp_frac).

Function2 = HICOMP soak temperature multiplier which is a function of:
  Delta temperature(s) (delta_temp) = actual temperature(s) minus shut-down temperature(s); and
  Absolute temperature(s) (abs_temp).

Function3 = HICOMP percent methanol multiplier as a function of percent of methanol.

Function4 = HICOMP hot rail multiplier as a function of FUELRAIL_TRM; used when rail is hot.

Function5 = Amount of time to use HICOMP hot rail multiplier of Function4 when rail is hot; a function of FUEL_DEG_F.

FRCHIC = Fraction of ECT or ACT to use in Function1. If FRCHIC = 1.0, all ACT is used, if FRCHIC = 0, all ECT is used.

Figure 2:
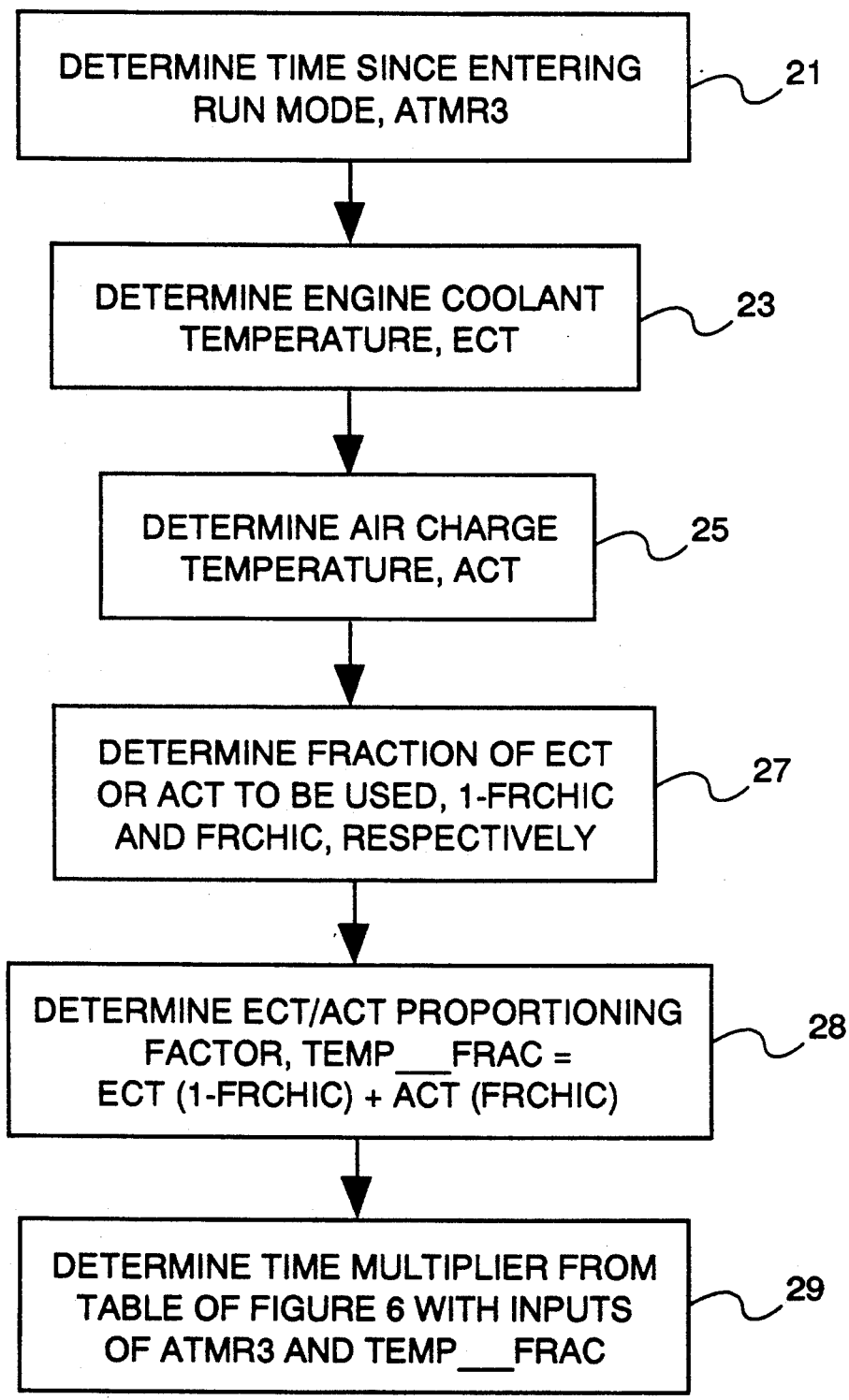
FIG. 2 is a block diagram flow chart for calculating a time multiplier for use in the method and system.

Referring now to FIG. 2, there is illustrated the steps taken in order to calculate a time multiplier, Function1, which, in turn, is used to calculate the correction factor HICOMP.

At block 21, the time since entering a run mode of the engine is determined from the timer 19.

At block 23, an engine coolant temperature is determined from a signal generated by the sensor 22.

At block 25, an engine air charge temperature is determined from a signal generated by the sensor 20 which is preferably positioned to measure the temperature of the air in the engine's air induction system such as an intake or exhaust manifold.

At block 27, the fraction of ECT or ACT to be used in determining the time multiplier is determined. This fraction is determined empirically based on the configuration of the engine.

At block 28, an ECT/ACT proportioning further is determined based on the current values of engine coolant temperature and the air charge temperature as well as the fraction of the ECT and the ACT to be used.

Figure 6:
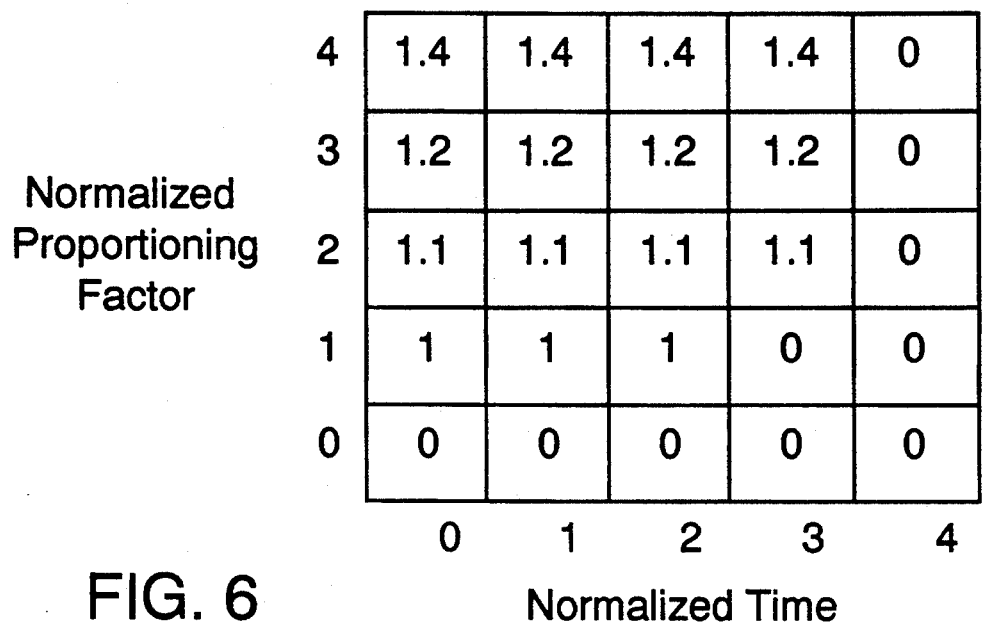
FIG. 6 is a table utilized in calculating the time multiplier of FIG. 2.

At block 29, the time multiplier is determined from the table of FIG. 6. The inputs of the table are normalized values of ATMR3 and the ECT/ACT proportioning faction.

In general, Function1 of FIG. 6 is a function of AMTR3 and the variable, temp_frac. Function1 is a table which utilizes time since engine run on its X axis and the ECT\ACT proportion factor on the Y axis. The time input is used to decrease the fuel pulse width relative to fresh lower temperature fuel being supplied by the fuel pump and as a fail-safe of overfueling due to poor temperature inputs.

The Y axis ECT\ACT proportioning input is meant to infer fuel injector cooling from the fresh fuel supplied to that of water circulation and air ingestion of the engine 14 after the start of the engine 14. The proportioning factor is useful to maximize these comparable heat transfer mechanisms.

Figure 3:
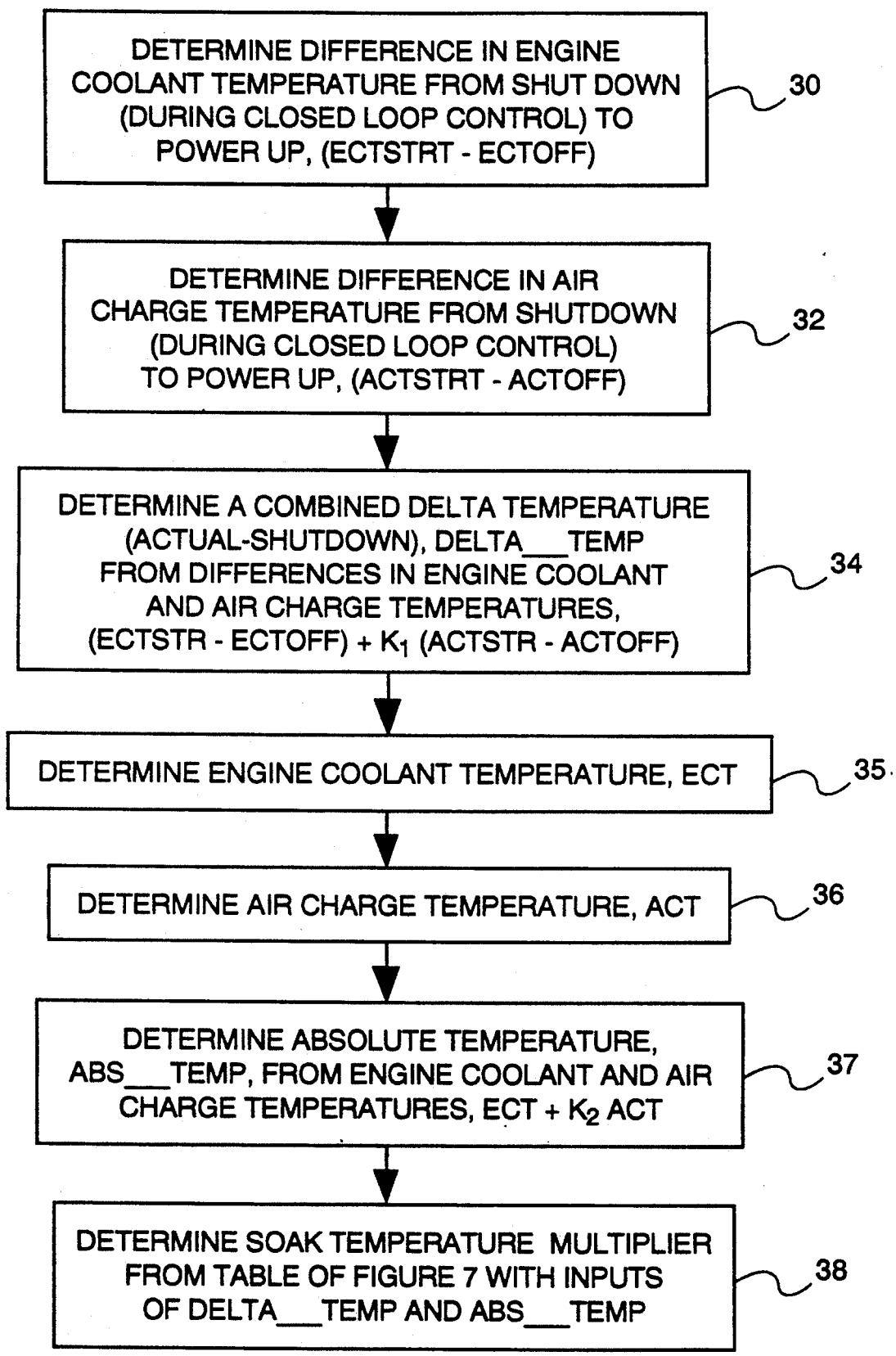
FIG. 3 is a block diagram flow chart for calculating a soak temperature multiplier.

Referring now to FIG. 3, there are illustrated the steps taken in order to calculate a soak temperature multiplier, Function2, which, in turn, is used to calculate the correction factor, HICOMP.

At block 30, the difference in coolant temperature between shut-down at the end of a run mode to power-up at the beginning of another run mode is determined from a value stored in the memory 18 and a current value of the coolant temperature.

At block 32, the difference in air charge temperature between shut-down at the end of a run mode to power-up at the beginning of another run mode is determined from a value stored in the controller 16 and a current value of the air charge temperature.

At block 34, a combined delta temperature value is determined from the two differences of blocks 30 and 32 and a constant, $K_1$, which is dependent on engine configuration.

At block 35, current engine coolant temperature is again determined.

At block 36, current air charge temperature is again determined.

At block 37, absolute temperature is determined from the air charge and coolant temperatures of blocks 35 and 36 with a constant $K_2$, again dependent on engine configuration.

Figure 7:
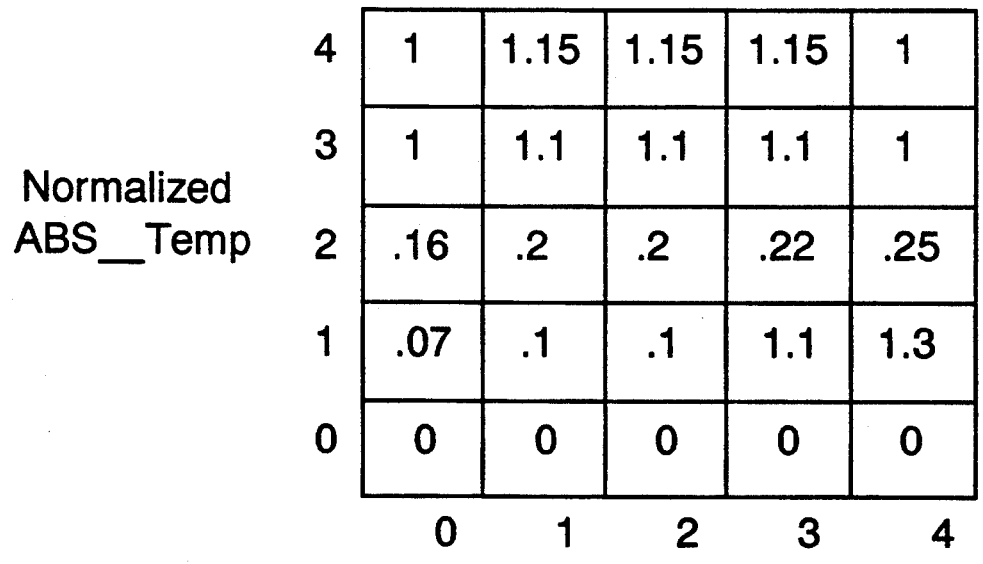
FIG. 7 is a table utilized in calculating the soak temperature multiplier of FIG. 3.

At block 38, the soak temperature multiplier is determined from the table of FIG. 7 with the normalized inputs determined from blocks 36 and 37.

In general, the soak temperature multiplier is a function of delta_temp (i.e. delta temperature) and absolute temperature. Function2 is a table which has a combined delta temperature on its X axis and a combined absolute temperature on its Y axis. The delta temperature is a temperature rise of ECT/ACT (engine coolant temperature/air charge temperature) at shut-down to the ECT/ACT at power-up. If a temperature rise occurred, it is assumed the vehicle has recently been shut-down and is actively transferring heat to the liquid fuel to be injected.

During this condition, volatile fuels can experience a partial vapor state such that injector pulse width must be increased. Absolute temperature on the Y axis is used to modify the amount of increase required as a function of the current temperature in a power-up. High absolute temperatures are usually obtained during extended idle conditions using air conditioning. Function2 attempts to describe the thermal potential from customer usage before engine shut-down and also during soak after shut-down.

Figure 4:
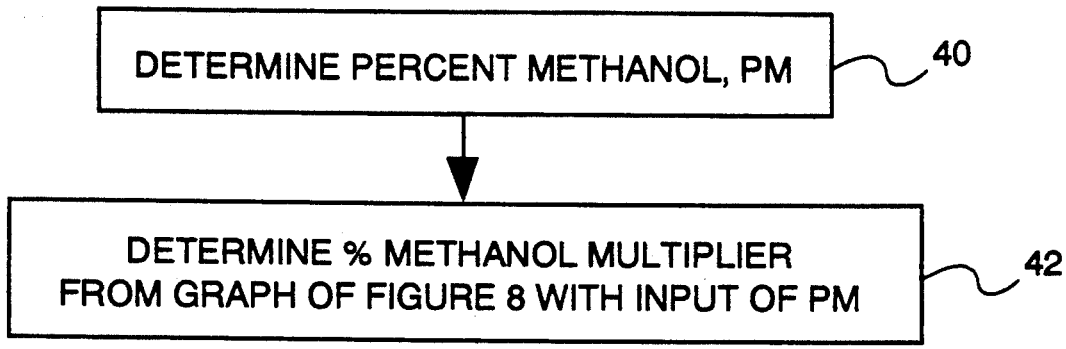
FIG. 4 is a block diagram flow chart for calculating a percent methanol multiplier for use with blended fuels.

Referring now to FIG. 4, there is illustrated in flow chart form the steps taken in order to calculate Function3, the percent methanol multiplier when a blended fuel such as a gasoline/methanol fuel is utilized.

At block 40, the percent methanol, PM, is determined by the controller 16 from a signal from the sensor 18. At block 42, Function3, the percent methanol multiplier is determined from the graph of FIG. 8. The multiplier is on the Y-axis with the percent methanol input on the X-axis.

Figure 8:
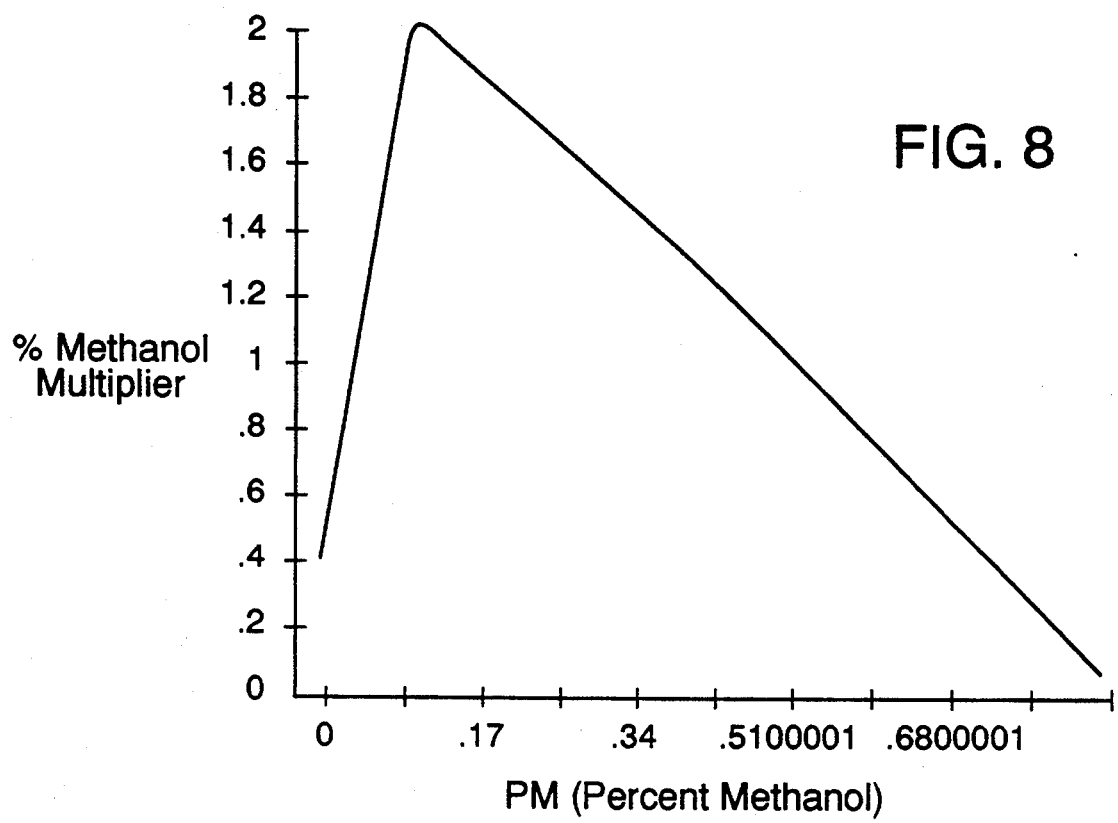
FIG. 8 is graph utilized in calculating the percent methanol multiplier of FIG. 4.

In general, Function3 determines a multiplier as a function of percent methanol. Fuel volatility varies with the percent of methanol blended and is most volatile at lower percentages near 10% methanol as illustrated in FIG. 8.

Figure 10:
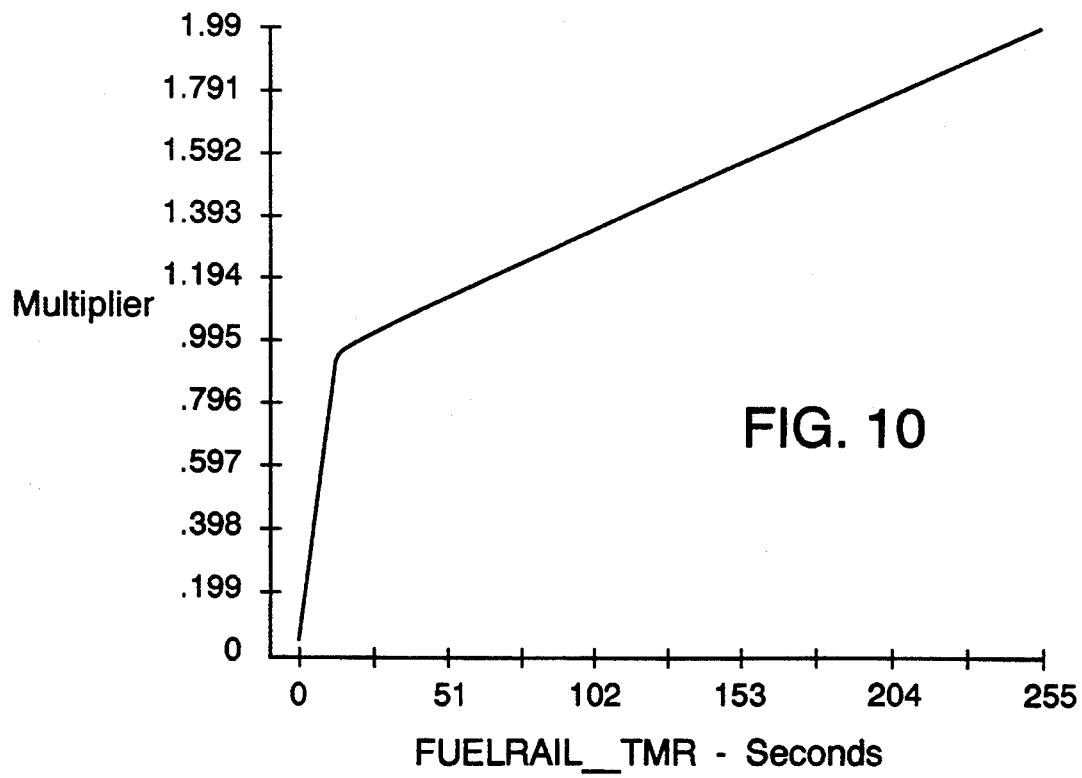
FIG. 10 is a graph also used in calculating the hot rail multiplier of FIG. 5.
Figure 5:
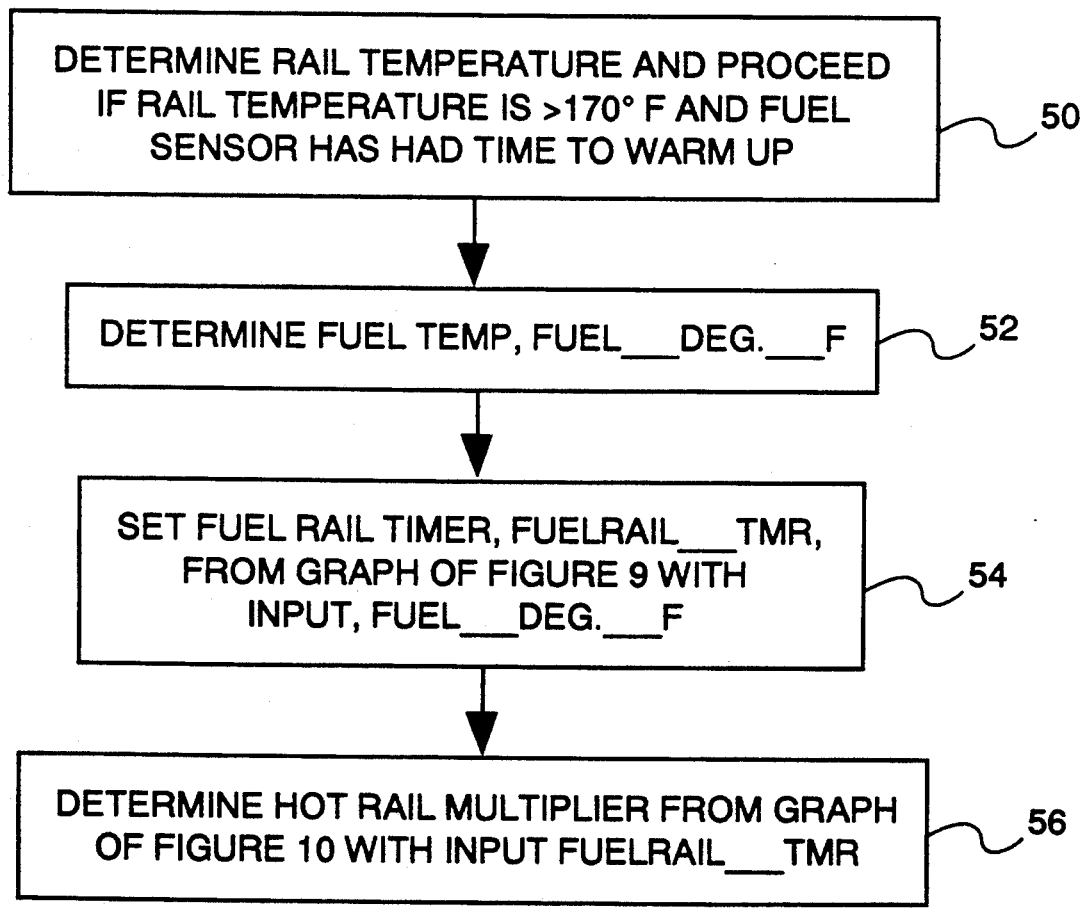
FIG. 5 is a block diagram flow chart for calculating a hot rail multiplier.
Figure 9:
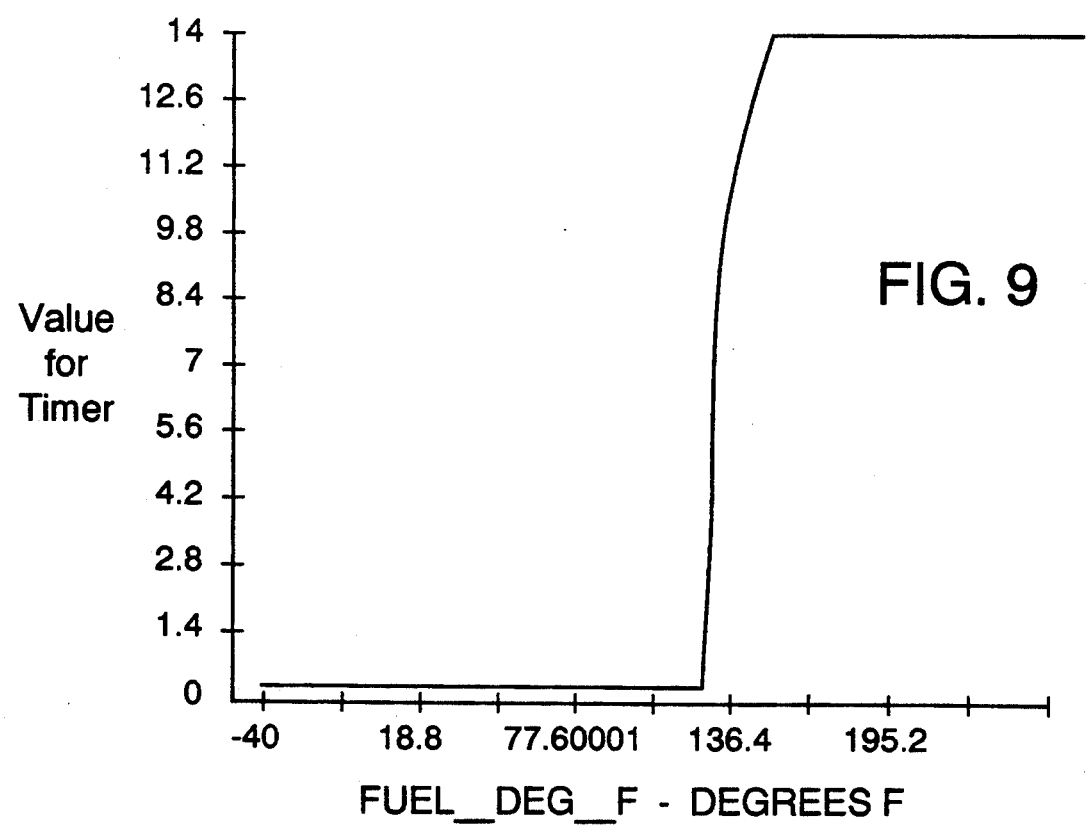
FIG. 9 is a graph used in calculating the hot rail multiplier of FIG. 5.

Referring now to FIG. 5 in combination with FIGS. 9 and 10, there is illustrated the steps taken in order to calculate a fourth multiplier, Function4, as a function of fuelrail_TMR. The hot rail multiplier is utilized when the fuel rail is relatively hot.

At block 50, fuel rail temperature is determined from the sensor 26. If the rail temperature is over 170° F. and the sensor 26 has had sufficient time to warm up the algorithm proceeds to block 52.

At block 52, fuel temperature is determined.

At block 54, a fuel rail timer is set with a value determined from the graph of FIG. 9 with the fuel temperature derived at block 52 as the x-axis input. This is also referred to as Function5 in FIG. 1.

At block 56, the hot rail multiplier is determined from the graph of FIG. 10 with the value of the fuel rail timer derived at block 54 (i.e. Function5) as the x-axis input.

In general, ECT and ACT are selectable or combinable with different constants with respect to each of the above tables. Different engine configurations require different ECT/ACT input modifications to correctly infer the thermal potential and heat transfer of each engine/vehicle system with volatile gas and methanol fuel blends.

While the best mode for carrying out the invention has been described in detail, those familiar with the art to which this invention relates will recognize various alternative designs and embodiments for practicing the invention as defined by the following claims.

We claim:

1. In a fuel delivery system including a fuel injector for injecting a liquid fuel into an internal combustion engine, a method for modifying a control signal for the fuel injector, the volatility of the liquid fuel changing as a function of the temperature of the fuel delivery system, the engine having a first mode of operation in which the fuel is injected into the engine and a second mode of operation after the first mode in which the fuel is not injected into the engine, the method comprising the steps of:

generating a first set of temperature signals based on the temperature of the engine;

storing a data representation of a first shut-down temperature signal of the first set of temperature signals in memory, the first shut-down temperature signal being based on the temperature of the engine at the end of the first mode;

retrieving from memory the data representation of the first shut-down temperature signal at the end of the second mode just prior to re-entering the first mode;

calculating a net amount of heat transferred to the fuel delivery system based on a data representation of the first set of temperature signals including the data representation of the shut-down temperature signal;

calculating a correction factor based on the net amount of heat transferred to the fuel delivery system; and modifying the control signal based on the correction factor to obtain a modified control signal, the modified control signal providing accurate control of the fuel injector by compensating for the volatility of the fuel.

2. The method of claim 1 further comprising the step of generating a second set of temperature signals also based on the temperature of the engine, wherein the step of calculating the net amount of heat transferred is also based on the second set of temperature signals.

3. The method of claim 1 wherein the first set of temperature signals represents heat conducted to the fuel delivery system from the engine.

4. The method of claim 3 wherein the engine has a coolant and wherein the first set of temperature signals is based on the temperature of the coolant.

5. The method of claim 2 wherein the second set of temperature signals represents heat radiated and convected to the fuel delivery system from the engine.

6. The method of claim 5 wherein the engine has an air induction system and wherein the second set of temperature signals is based on the temperature of the air in the air induction system.

7. The method of claim 1 wherein the liquid fuel is a blended fuel including different liquid fuels and wherein the method further comprises the step of generating a blend signal based on the relative amount of one of the liquid fuels in the blended fuel and wherein the step of calculating the correction factor is also based on the blend signal.

8. The method of claim 1 further comprising the step of generating a fuel temperature signal based on the temperature of the fuel in the fuel delivery system and wherein the step of calculating the net amount of heat transferred is also based on the fuel temperature signal.

9. The method of claim 2 wherein the method further comprises the steps of storing a data representation of a second shut-down temperature signal of the second set of temperature signals in the memory, the second shut-down temperature signal being based on the temperature of the engine at the end of the first mode, and retrieving from memory the data representation of the second shut-down temperature signal at the end of the second mode and just prior to re-entering the first mode and wherein the step of calculating the net amount of heat transferred is also based on the data representation of the second shut-down temperature signal of the second set of temperature signals.

10. The method of claim 9 wherein the first set of temperature signals represents heat conducted to the fuel delivery system from the engine.

11. The method of claim 10 wherein the engine has a coolant and wherein the first set of temperature signals is based on the temperature of the coolant.

12. The method of claim 9 wherein the second set of temperature signals represents heat radiated and convected to the fuel delivery system from the engine.

13. The method of claim 12 wherein the engine has an air induction system and Where in the second set of temperature signals is based on the temperature of the air in the air induction system.

14. The method as claimed in claim 9 wherein the first and second sets of temperature signals include first and second power-up temperature signals, respectively, each of the first and second power-up temperature signals being based on a power-up temperature of the engine at the end of the second mode and just prior to re-entering the first mode and wherein the step of calculating the net amount of heat transferred includes the steps of:
   determining the difference between the first power-up temperature and the first shut-down temperature from the first set of temperature signals to obtain a first difference signal;
   determining the difference between the second power-up temperature and the second shut-down temperature from the second set of temperature signals to obtain a second difference signal; and
   determining a combined delta temperature signal from the first and second difference signals.

15. A system for modifying a control signal for a fuel injector of a fuel delivery system, the fuel injector injecting a liquid fuel into an internal combustion engine, the volatility of the liquid fuel changing as a function of the temperature of the fuel delivery system, the engine having a first mode of operation in which the fuel is injected into the engine and a second mode of operation after the first mode in which the fuel is not injected into the engine, the system comprising:

means for generating a first set of temperature signals based on the temperature of the engine;
   a memory for storing a data representation of a shut-down temperature signal of the first set of temperature signals, the first shut-down temperature signal being based on the temperature of the engine at the end of the first mode;
   retrieving means for retrieving the data representation of the first shut-down temperature signal at the end of the second mode just prior to re-entering the first mode from the memory;
   calculating means for calculating a net amount of heat transferred to the fuel delivery system based on a data representation of the first set of temperature signals including the data representation of the first shut-down temperature signal and a correction factor based on the net amount of heat transferred to the fuel delivery system; and
   means for modifying the control signal based on the correction factor to obtain a modified control signal, the modified control signal providing accurate control of the fuel injector by compensating for the volatility of the fuel.

16. The system of claim 15 further comprising means for generating a second set of temperature signals also based on the temperature of the engine, wherein the calculating means calculates the net amount of heat transferred based on the second set of temperature signals.

17. The system of claim 15 wherein the first set of temperature signals represents heat conducted to the fuel delivery system from the engine.

18. The system of claim 17 wherein the engine has a coolant and wherein the first set of temperature signals is based on the temperature of the coolant.

19. The system of claim 16 wherein the second set of temperature signals represents heat radiated and convected to the fuel delivery system from the engine.

20. The system of claim 19 wherein the engine has an air induction system and wherein the second set of temperature signals is based on the temperature of the air in the air induction system.

21. The system of claim 15 wherein the liquid fuel is a blended fuel including different liquid fuels and wherein the system further comprises means for generating a blend signal based on the relative amount of one of the liquid fuels in the blended fuel and wherein the calculating means calculates the correction factor based on the blend signal.

22. The system of claim 15 further comprising means for generating a fuel temperature signal based on the temperature of the fuel in the fuel delivery system and wherein the calculating means calculates the net amount of heat transferred based on the fuel temperature signal.

23. The system of claim 16 wherein the memory also stores a data representation of a second shut-down temperature signal of the second set of temperature signals, the second shut-down temperature signal being based on the temperature of the engine at the end of the first mode, the retrieving means retrieving the data representation of the second shut-down temperature signal at the end of the second mode and just prior to re-entering the first mode from the memory and wherein the calculating means calculates the net amount of heat transferred based on the data representation of the second shut-down temperature signal of the second set of temperature signals.

24. The system of claim 23 wherein the first set of temperature signals represents heat conducted to the fuel delivery system from the engine.

25. The system of claim 24 wherein the engine has a coolant and wherein the first set of temperature signals is based on the temperature of the coolant.

26. The system of claim 23 wherein the second set of temperature signals represents heat radiated and convected to the fuel delivery system from the engine.

27. The system of claim 26 wherein the engine has an air induction system and wherein the second set of temperature signals is based on the temperature of the air in the air induction system.

28. The system as claimed in claim 23 wherein the first and second sets of temperature signals include first and second power-up temperature signals, respectively, each of the first and second power-up temperature signals being based on a power-up temperature of the engine at the end of the second mode and just prior to re-entering the first mode and wherein the calculating means:

determines the difference between the first power-up temperature and the first shut-down temperature from the first set of temperature signals to obtain a first difference signal;

determines the difference between the second power-up temperature and the second shut-down temperature from the second set of temperature signals to obtain a second difference signal; and determines a combined delta temperature signal from the first and second difference signals.

* * * * *